Oct. 28, 1941.  R. CHILTON  2,261,019
REGENERATIVE TRANSMISSION
Original Filed June 18, 1938  5 Sheets-Sheet 1

INVENTOR
ROLAND CHILTON
BY
ATTORNEY

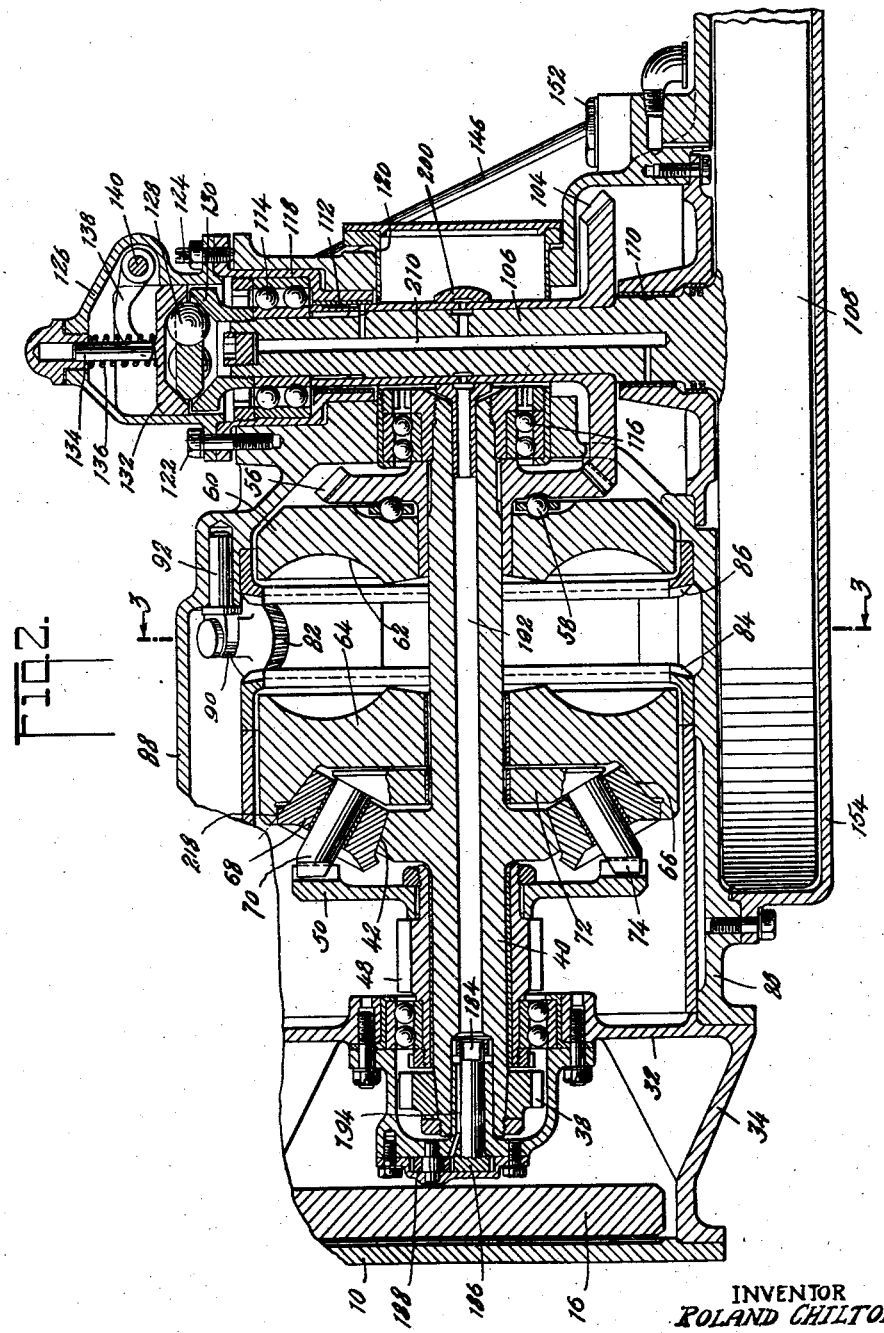

Oct. 28, 1941.　　　　R. CHILTON　　　　2,261,019
REGENERATIVE TRANSMISSION
Original Filed June 18, 1938　　5 Sheets-Sheet 3
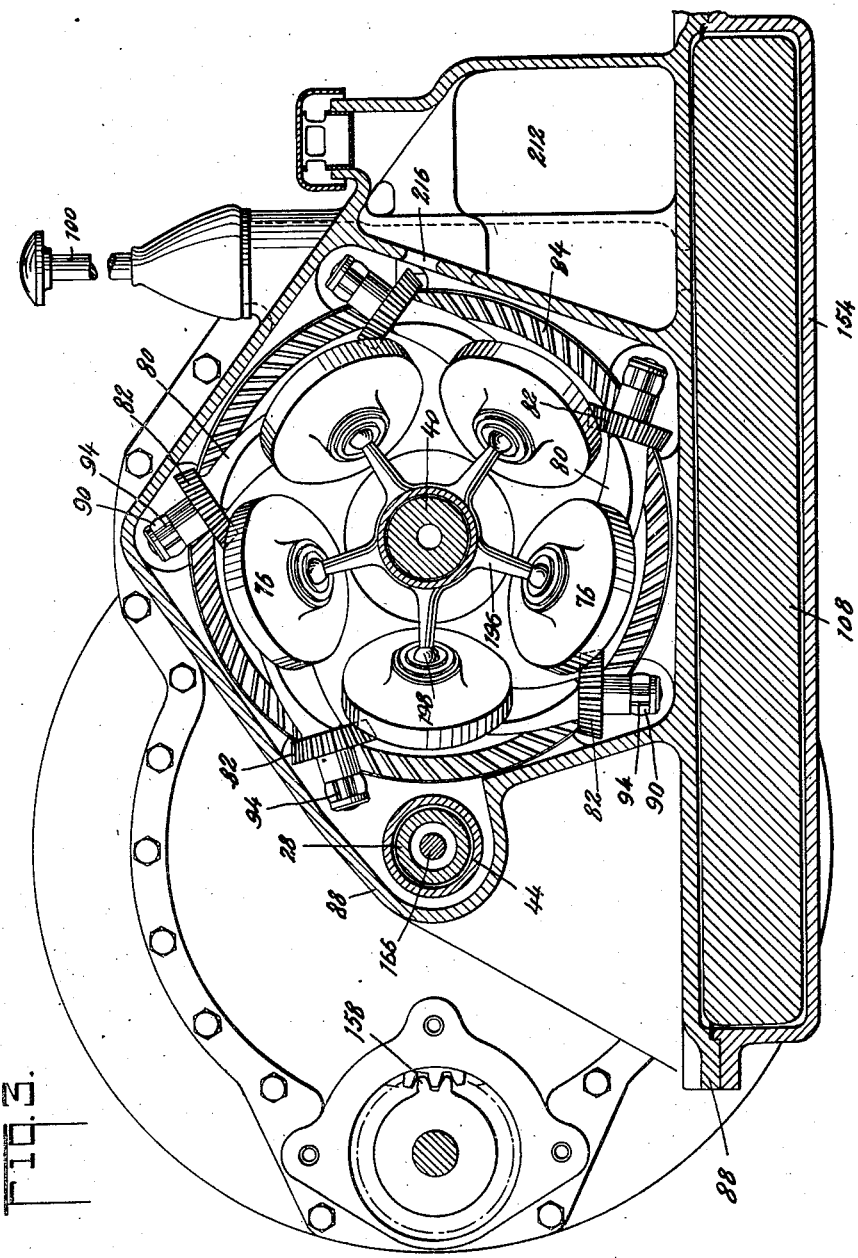
INVENTOR
ROLAND CHILTON
BY
ATTORNEY Oct. 28, 1941.    R. CHILTON    2,261,019
REGENERATIVE TRANSMISSION
Original Filed June 18, 1938    5 Sheets-Sheet 4
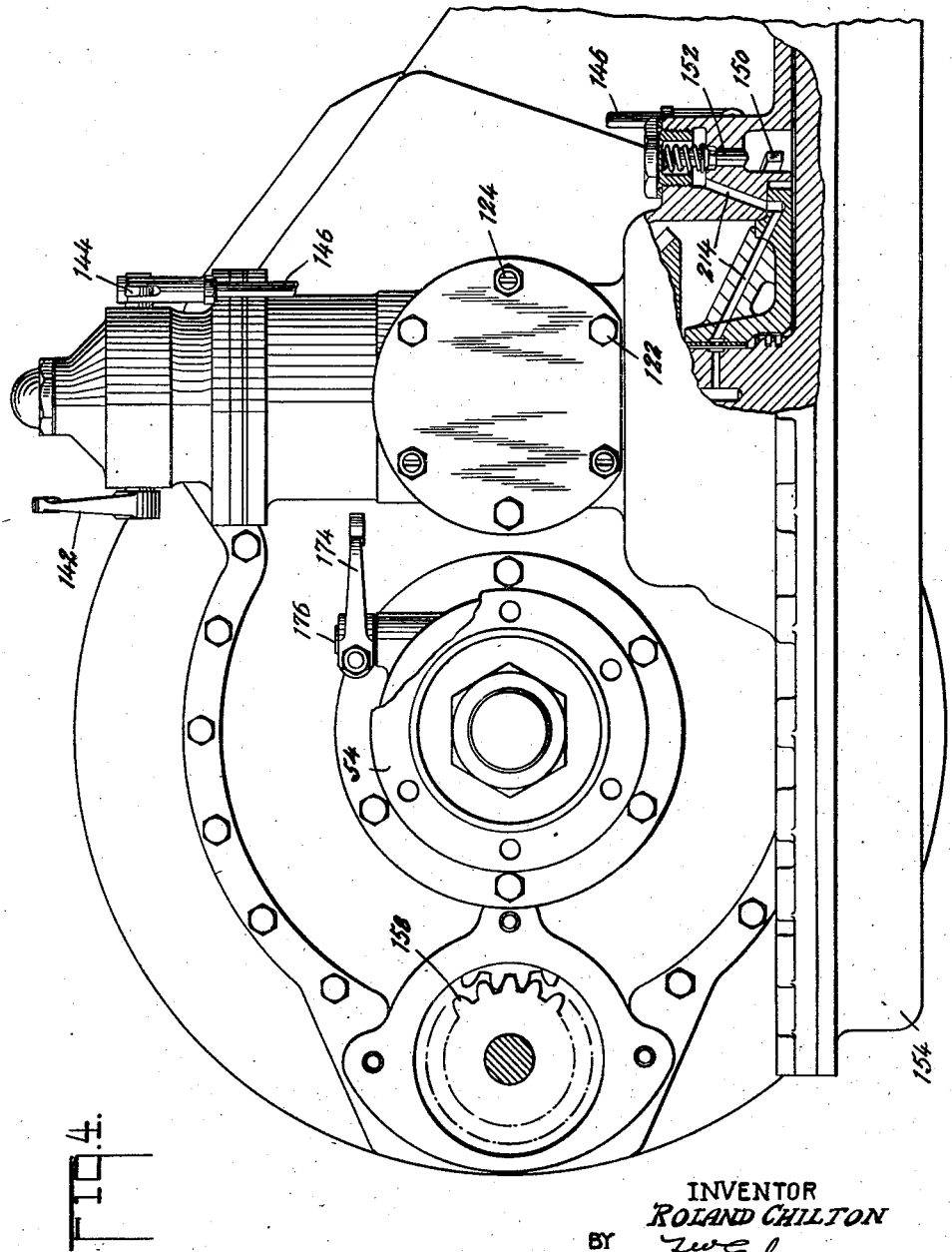

Oct. 28, 1941.   R. CHILTON   2,261,019
REGENERATIVE TRANSMISSION
Original Filed June 18, 1938   5 Sheets-Sheet 5
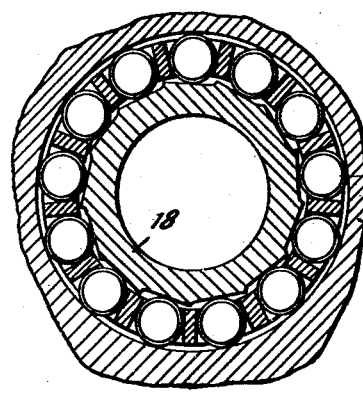
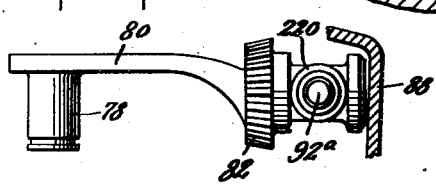
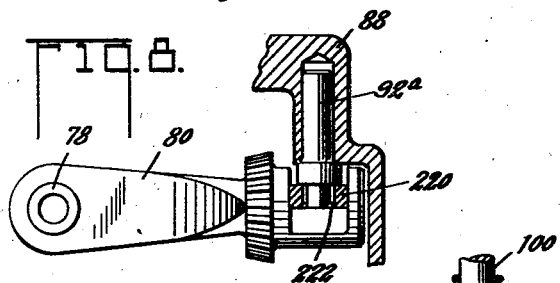
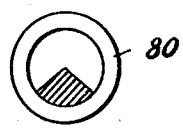
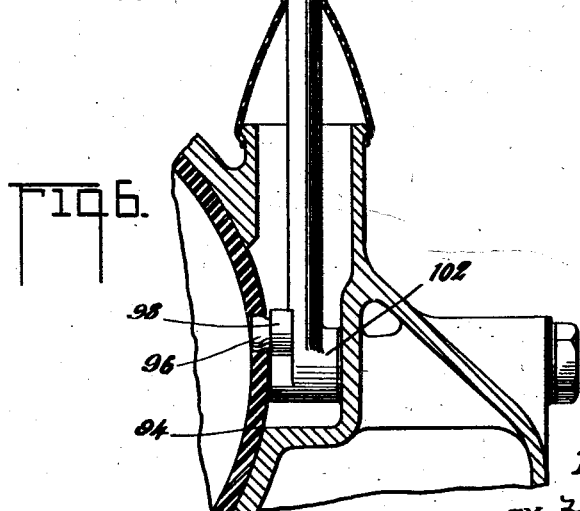
INVENTOR
ROLAND CHILTON
BY
ATTORNEY Patented Oct. 28, 1941

2,261,019

UNITED STATES PATENT OFFICE 2,261,019

REGENERATIVE TRANSMISSION

Roland Chilton, Ridgewood, N. J.

Substituted for abandoned application Serial No. 214,417, June 18, 1938. This application July 9, 1940, Serial No. 344,480

6 Claims. (Cl. 74—572)

The present application is a substitute for application Serial No. 214,417, filed June 18, 1938, and thereafter forfeited.

This invention relates to the regenerative type of transmission system disclosed in my Patent No. 2,118,590, wherein a transmission controllable to enforce an infinitely variable range of torque and speed ratios, drivably connects a high speed energy storing flywheel to a means to be driven, for instance, a vehicle.

In such a system, by mere change in driving ratio, energy may be transferred from the vehicle to the flywheel for deceleration of the vehicle and from the flywheel to the vehicle for acceleration of the vehicle. In other words, the variable speed and torque transmission is a means drivably connecting the energy storing flywheel and the vehicle for acceleration of either by deceleration of the other by mere change in the driving ratio and without change in the gross kinetic energy of the system.

Taking a typical case of a flywheel energizable to a velocity (at its radius of gyration) of ten times the maximum speed to be impressed upon the vehicle, the flywheel weight being 2% of the weight of the vehicle, then the flywheel is capable of storing twice the energy needed to accelerate the vehicle from rest to maximum speed, which energy will be given up when the flywheel is decelerated in the ratio of approximately 14:10. Conversely, by accelerating the flywheel in the ratio 10:14 R. P. M. by mere change in transmission ratio, the vehicle will be brought to rest from maximum speed by transfer of its energy of motion to the flywheel, which energy will be available for subsequent vehicle acceleration.

The present invention teaches improved mechanisms for effecting this regenerative speed control of driven means comprising masses to be accelerated and decelerated, such as vehicles.

Objects of the present invention are to increase the effective torque capacity of transmission mechanism by running it at high rotational speeds and to provide an improved flywheel disposition. The invention includes improvements in starting means and in other structure as will be clear from the following description with reference to the drawings, in which:

Fig. 2 is a sectional elevation on the line 2—2 of Fig. 1;

Fig. 3 is a transverse section on the line 3—3 of Fig. 2;

Fig. 4 is an end view in fragmentary section on the line 4—4 of Fig. 1;

Fig. 5 is a fragmentary axial view of a one-way driving clutch;

Fig. 6 is a fragmentary section on the line 6—6 of Fig. 1, and

Figure 1:
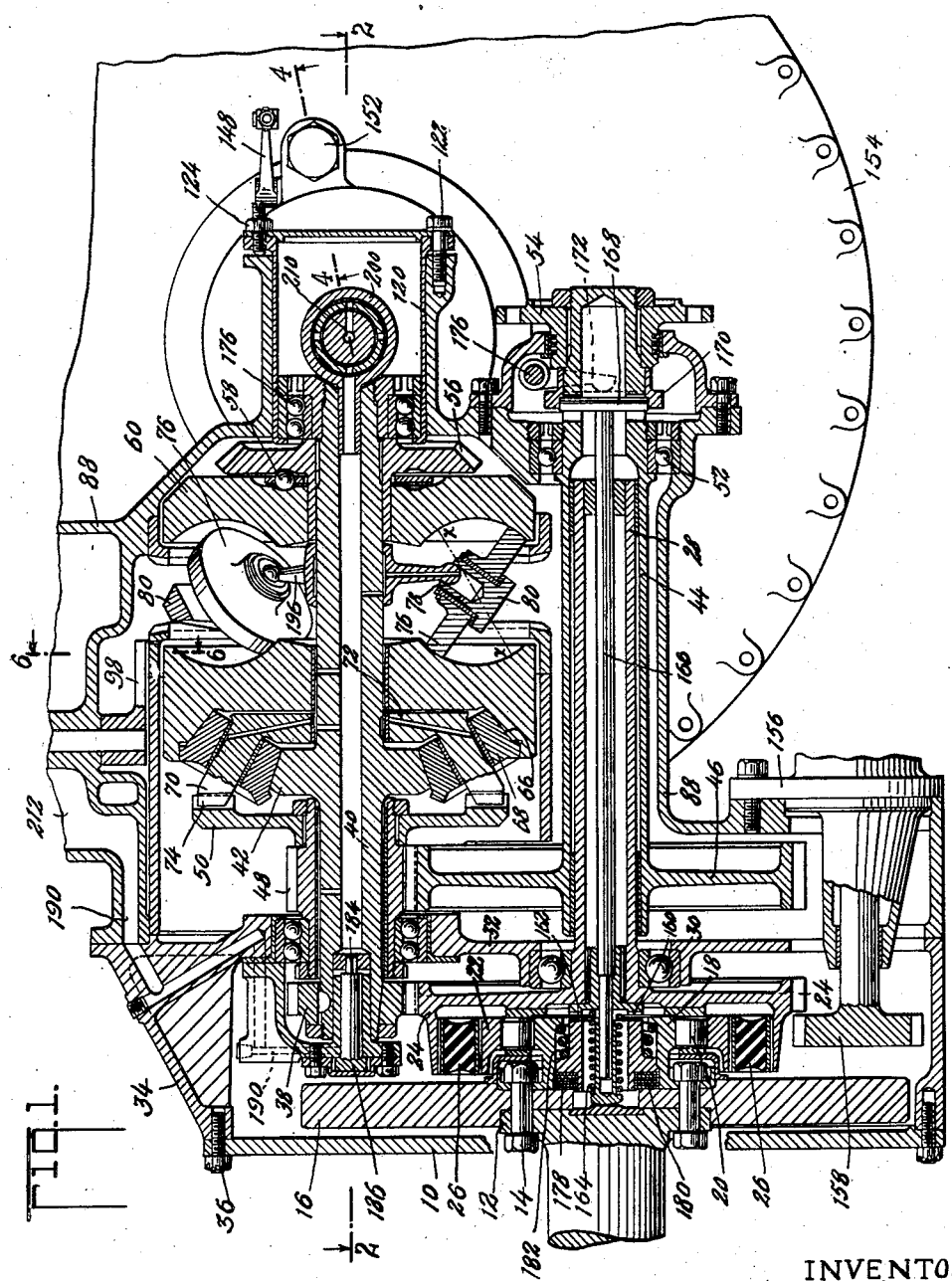
Fig. 1 is a plan section through axes of driving, driven and transmission shafts.

Figs. 7, 8, and 9 are detail views showing a modified construction of roller control arm anchorages.

Referring first to Figs. 1 and 2, 10 designates the backplate of a conventional engine having a normal crankshaft flange 12 to which is secured by bolts 14 a normal engine flywheel 16 and an inner or cam member 18 of a one-way clutch comprising rollers 20 engaging an outer ring 22 (see also Fig. 5). The ring 22 drives a driving gear 24 through spring means 26 indicated as an annular rubber element. The gear 24 is integral with a shaft 28 supported in a bearing 30 carried in a wall 32 of a front housing 34 secured to the engine backplate 10 as by bolts 36.

The gear 24 meshes with a high speed pinion 38 rigid with a main transmission shaft 40 having a coned raceway or drive member 42. Surrounding the shaft 28 of the driving gear 24 is a driven shaft 44 carrying a gear 46 meshed with a pinion 48 rigid with a drive plate 50 and mounted for free rotation on the main shaft 40. The shaft 44 of the gear 46 extends through a rear bearing 52 and the extension carries a conventional propeller shaft driving flange 54 from which the vehicle is driven in the usual way.

Splined to the rearward end of the transmission shaft 40 is a bevel gear 56 having cam-form pockets engaging torque-responsive balls 58 which, in turn, engage corresponding cam tracks in a driving disc 60 having a toroidal face 62, which is thus subject to torque-responsive axial loading.

Mounted for free rotation on the shaft 40 is a companion driven toroidal disc 64 having an annular cone driving track 66. Engaged between the track 66 and the drive cone 42 of the shaft 40 are planetary coned rollers 68 rotatable on spindles 70 integral with a planetary member 72 and having a slotted driving engagement with the drive plate 50 as indicated at 74.

Engaged between the opposed toroidal discs 60—64 are nonplanetary transmission rollers 76 rotatable on spindles 78 extended as rigid cantilevers from control arms 80 which, in turn, extend tangentially to integral bevel pinions 82 engaged between opposed hypoid ring gears 84—86, rotatable in a main housing 88. The roller mounting and control arms 80 are provided at their outer ends with collars between which are fitted forked ends 90 of anchor members 92 fitted in bores accurately spaced in the housing 88. It will be seen that the control arms 80 are located against end-wise or tangential movement by the anchor forks 90 which resist the tangential driving effort on the rollers but which have slight clearance as indicated at 94 (Fig. 3) for slight lateral motion of the outer ends of the arms. The spacing and lateral location of the arms 80 is controlled by the pinions 82 meshed with the opposed hypoid ring gears 84—86 and one of these, 84 in this case, has a slot engaged by a ball end 96 (see Fig. 6) integral with a control arm 98 rigid with an operator's control lever 100 pivotally mounted on a spindle 102.

It will now be seen that equal and opposite rotation of the hypoid control ring gears 84—86 will follow any ratio changing angulation of the rollers 76 without lateral or off-tangency displacement of the pinions 82. On the other hand, unequal rotation of the ring gears, or initial rotation of the control gear 84 alone by the operator's control lever 100, will tend to laterally displace the pinions 82, upsetting the normal tangential disposition of the rollers 76, which displacement initiates precession of the rollers 76 towards a new ratio position. Such precession, be it noted, rotates the pinions 82 and these pinions in turn react on their contacts with the ring gear 84 so that the precession will only continue as long as this movement is followed up by the control lever 100. With the control lever 100 (and therefore the ring gear 84) held, any tendency of the rollers 76 to move from their instant angular position will tend to roll the pinions 82 around the ring gear 84 introducing a displacement from tangency which will counteract the movement. Thus, the rollers are stabilized in the angular position dictated by the control gear 84 while the companion or floating control gear 86 engaging the opposite sides of the pinions acts as a vinculum restraining all the rollers to identical angular positions.

The bevel gear 56 is engaged with a similar gear 104 rigid with a vertical shaft 106, in turn integral with a large diameter flywheel 108, the flywheel being supported in bearings 110—112—114. The end of the transmission shaft 40, just beyond the driving bevel gear 56 is supported in a bearing 116. The bearings 114 and 116 are clamped in sleeves 118—120 axially adjustable in the housing 88 by cap screws 122 and jack screws 124 to obtain correct mesh of the bevel gears 56—104.

A governor mounted in a housing 126 comprises balls 128 driven by a cone member 130 rigid with the high speed flywheel shaft 106 and engaging a cone member 132 guided by an integral spindle 134 for plunging action against the pressure of a governor spring 136. The plunging cone member 132 is engaged by a lever 138 rigid with a shaft 140 which, in turn, carries two external levers, one, 142 being connected to the throttle of the engine (not shown) and the other, lever 144, being connected by a rod 146 to a lever 148 rigid with a lever 150 adapted, on extreme governor movement, to lift an oil flooding valve 152 (Figs. 1 and 4). Preferably, the flywheel is enclosed by a cover 154 bolted to the housing 88, as shown, and oil is admitted to the small space around the flywheel by means of the mechanism just described whenever the flywheel reaches a limiting maximum speed set by the adjustment of the governor spring 136.

Referring now to Fig. 1, 156 designates a starter bolted to the housing 88 and having a gear 158 engageable with the gear 24 by suitable meshing means (not shown). Splined internally into the left hand end of the shaft 28 of the gear 24 is a starter jaw 160 normally kept out of contact with a companion jaw 162 by a spring 164, but movable leftwards to effect such engagement by means of a rod 166 extending through the shaft 28 and engaging, at the right hand end thereof, a cross pin 168 operated by a sliding collar 170 engaged by an internal lever 172 rigid with an external control lever 174, Fig. 4, through a shaft 176. The driven starter jaw 162, Fig. 1, has splined to its leftward end clutch plates 178 interleaved with driven clutch plates 180 splined into the roller clutch member 18 previously described as rigid with the flange 12 of the engine crankshaft. The clutch plates are permanently frictionally engaged under the pressure of a clutch spring 182.

Driven from the left hand of the transmission main shaft 40 at 184 is an oil pump comprising gears 186—188 which pump draws oil through suitable passages 190 from an oil sump 212 (Fig. 3) and which oil is delivered under pressure to a bore 192 in the main shaft 40 through suitable ducts 194 (Fig. 2).

Slidable on the main shaft 40 is a member 196 comprising radial arms having ball heads 198 fitted in bores formed in the roller bearing spindles 78 by which means these spindles are pressure lubricated. A second oil collector member 200 serves to convey oil from the bore 192 of the main shaft 40 to the axial hole 210 in the flywheel shaft 106 from whence the oil is led to the various bearings and to the flywheel, and at the same time flooding the valve 152 by oil fed thereto from the duct 210 by suitable drillings 214 (Fig. 4). The oil is returned to the oil sump 212 by being splashed through the action of the rotating parts through a suitable high level catchment slot 216 (Fig. 3).

In this organization the planetary coned rollers 68 are subject to high centrifugal force and to thrust reactions from their contact load. One of the features of the invention resides in novel means for resisting these forces, as follows: The floating toroidal disc 64 is provided with a cylindrical track 218, the mid-width of which intersects a continuation of the cone race 66, and the roller is provided with a crowned head engaging the cylindrical track. This track is preferably opposite to the center of gravity of the rollers which it restrains against centrifugal force by rolling contact, the rolling velocities hereat being the same as at the conical race 66 in virtue of the intersecting disposition just described.

The operation of the device is as follows: For clearness, the following points are recapitulated. The driving gear 24, the pinion 38, transmission main shaft 40, the bevel gears 56—104 and the flywheel 108 are all permanently geared together and always rotate at fixed speed ratio. Similarly, the driven planet spider 70, driven disc 50, driven pinion 48, the driven gear 46 with its shaft 44 and the final output coupling flange 54 are similarly geared together and always rotate in fixed ratio. Between these two systems there is interposed the variable speed organization including th discs 62—64 and the interposed tiltable rollers 76. The variable speed transmission has a ratio range extending from 1-1 to 1-0, affording this ratio range between the driving gear 24 and the driven gear 46 and with it the output coupling flange 54.

As to starting, the energy storing flywheel 108 is used as an inertia starting means. On energization of the starting motor 156, with the starter jaws 160—162 in their normally disengaged position, the starter gear 158 meshes with and drives the gear 24 which, in turn, slowly accelerates the flywheel 108 through the main shaft pinion 38, main shaft 40 and flywheel gears 58—104 previously described. When the flywheel has reached a suitable speed, the starter jaws will be engaged by operation of the lever 174 through the shaft 176, collar 170, cross pin 168 and thrust rod 166, as previously described. Upon this engagement of the starter jaw 160 with the engine jaw 162, the slip clutch 178—180 will slip under the present torque of this clutch until the engine is accelerated to correspond to flywheel speed. As soon as the engine starts to fire, the starter jaw control 174 will be released. The foregoing is in accordance with the operation of slip clutch inertia starters as taught initially in my Patent No. 1,561,506. However, in this case, the disposition is novel in that the energy storing flywheel of the regenerative system itself is utilized as the inertia starter means. Moreover, it will be understood that the roller clutch 20 permits the transmission as a whole to over-run the engine during this starting energization of the flywheel.

The operation of the ratio changing organization of the transmission has already been described. With the rollers 76 in the position shown, the transmission is in 1:1 ratio and, with the rollers swung to the position indicated by the dotted line X—X of Fig. 1, the transmission is in 1:0 ratio. Such ratio change is effected as follows: The driving disc 62 and the cone race 42 rotate unitarily with the main shaft 40. The rollers 76 in the position X—X give the same ratio between the discs 62—62 as afforded between the discs 64 and the cone race 42 by the planetary rollers 68. The spindles of the rollers 76 are non-planetary, i. e., the centers of these rollers are stationary wherefrom it follows that the spindles 70 of the coned rollers 68 must also be stationary and with them the connected elements comprising the driven disc 50, the pinion 48, the gear 46, the driven shaft 48 and the final drive coupling 54.

When the engine starts, the flywheel will be rotating at the very low speed impressed by the starter 156 and the engine will proceed to accelerate the flywheel, the engine throttle being held open by the flywheel driven governor 126—142. When the flywheel has reached a desired high speed, predetermined by the characteristics and adjustment of the governor, the engine throttle will be automatically closed, bringing the engine to "idle", with the flywheel running at governed speed, the one-way clutch 18—22 being organized for this purpose. This starting and initial flywheel acceleration is performed in 1:0 ratio, to which condition the transmission was necessarily brought in order to stop the vehicle, and the driven coupling 54 remains stationary in 1:0 ratio regardless of the speed of the flywheel and of the associated transmission parts. To accelerate the vehicle, the control lever 100 is progressively advanced from this zero ratio position and the energy for accelerating the vehicle is thus abstracted from the flywheel 108 by deceleration thereof as the transmission is moved towards 1:1 ratio. Conversely, as the control lever 100 is retracted towards 1:0 ratio, the flywheel is accelerated and the vehicle decelerated, thus transferring the kinetic energy of the vehicle to the flywheel and achieving regenerative braking according to teachings of my Patent No. 2,118,590.

Figs. 7 and 9 illustrate a detail modification of the roller arm anchoring means 90, providing an anti-friction construction. In this construction, the shoulders on the roller control arms have been modified to embrace a roller 220 mounted on an anti-friction (needle type) bearing 222, journaled on the anchor pin 92a, as shown. As has been said before, the torque reaction on the rollers devolves on the roller arm anchor means whereat the arms are displaced laterally by a minute amount when the control mechanism initiates the precessing movement of the rollers 76 by which the ratio is changed. It will be obvious that the object of the anti-friction roller bearing 220—222 is to minimize the frictional restraint to the minute displacement of the arms by which the roller precession is initiated.

A minimum of friction in the control means is especially important in the case of a manually controlled regenerative system applied to a vehicle because it is a feature of this system that the entire speed control for starting, stopping, accelerating and decelerating the vehicle is vested in the hand control lever 100. This lever replaces the usual throttle, clutch, accelerator pedal and shift lever. All increase and decrease in vehicle speed is responsive exclusively to the rate of movement of this single control lever. In fact, the speed of the driving wheels of the vehicle will follow rigidly the movement of the lever although, if the rate of movement be excessive, the tractive capacity of the driving wheels will be exceeded and slippage will occur. This unusual capacity is an inherent characteristic of this kinetic transmission system wherein the rate at which energy may be abstracted from the energy storing flywheel is proportional to the rate at which the ratio is changed by the control lever and is limited only by the physical strength of the transmission, the tractive capacity at the driving wheels and/or the comfort of the passengers.

This instant response of the rate of acceleration of the driving wheels to the rate of movement of the control lever is different from the action of the conventional "accelerator" which, when fully and suddenly depressed, merely applies maximum of engine torque to the driving system, which torque (in "high" gear) is capable of imposing only a moderate rate of vehicle acceleration. In "low" gear in conventional vehicles, on the other hand, the engine torque is capable of slipping the rear wheels and optimum vehicle acceleration is conventionally obtainable in this gear alone. With the kinetic system of this invention, on the other hand, optimum acceleration is obtainable throughout the speed range, this being one of the basic characteristics of this system which, however, requires a judicious rate of movement of the control lever and/or dampening means therein to mechanically limit the maximum rate of travel.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A transmission including in combination, concentric driving and driven gears, concentric pinions meshed with respective gears for high speed rotation relative thereto, a transmission adapted to enforce progressively variable speed ratios between said pinions, and a flywheel drivably connected at fixed ratio with the pinion which engages the driving gear.

2. A transmission between an engine and a propelling shaft comprising in combination, concentric gears mounted for rotation with said engine and shaft respectively, a pinion meshed with said engine gear for high speed rotation relative thereto, a flywheel, fixed ratio means drivably connecting said flywheel and pinion, a pinion meshed with said propeller shaft gear for high speed rotation relative thereto, and a transmission concentric with said pinions and adapted to enforce progressively variable speed ratios therebetween.

3. In combination with an engine power shaft and a driven shaft concentric therewith, of gears drivably engaging respective shafts, concentric pinions engaging respective gears for high speed rotation relative thereto, a transmission adapted to enforce progressively variable driving ratios between said pinions, a flywheel, and fixed ratio means drivably connecting said flywheel to said engine-gear-engaging-pinion.

4. In apparatus of the class described, layshaft mechanism including a pair of concentric pinions and a transmission controllable to enforce progressively variable speed ratios between said pinions, an engine gear meshed with one of said pinions for low speed rotation relative thereto, a driven gear concentric with the engine gear and meshed with the other pinion for low speed rotation relative thereto, a flywheel, and fixed ratio means drivably connecting said flywheel and said engine-gear-engaging pinion.

5. In apparatus of the class described, a layshaft comprising concentric pinions and a transmission adapted to enforce progressively variable speed ratios therebetween, engine and driven gears concentric with each other and meshed with respective pinions, and an energy-storing flywheel drivably connected with the engine-engaging pinion, each said pinion being substantially smaller than the engaged gear whereby the torque load on said transmission is less than that on said gears.

6. In a regenerative transmission system, in combination, an engine, an energy-storing flywheel geared up from the engine to more than engine speed, a one-way clutch normally preventing the flywheel from driving the engine, an infinitely variable speed transmission organization adapted to transfer energy from said flywheel to a means to be driven and vice versa, a second clutch adapted to transfer energy from the flywheel to the engine for starting the latter, and a power means adapted to impart starting energy to the flywheel with the engine and the means to be driven at rest.

ROLAND CHILTON.